Feb. 24, 1931. A. A. THOMAS 1,793,568
ELECTROMAGNETIC TRANSMITTER AND RECEIVER
Filed Dec. 16, 1927
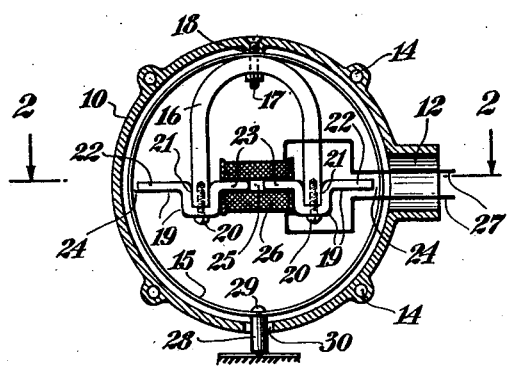
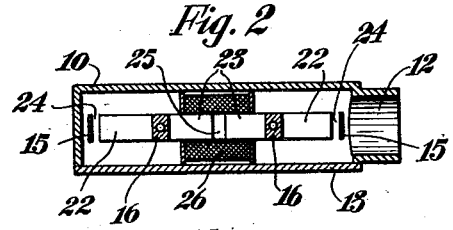
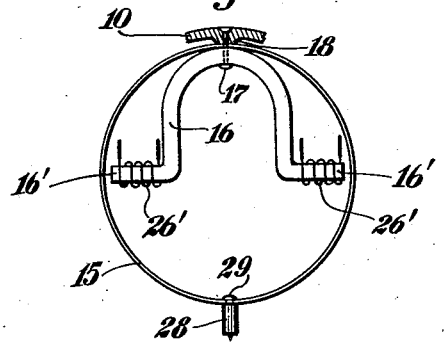
INVENTOR
Adolph A. Thomas Patented Feb. 24, 1931

1,793,568

UNITED STATES PATENT OFFICE

ADOLPH A. THOMAS, OF NEW YORK, N. Y.

ELECTROMAGNETIC TRANSMITTER AND RECEIVER

Application filed December 16, 1927. Serial No. 240,390.

My invention is for an electromagnetic instrument of novel construction adapted to operate as transmitter and receiver. As will appear later, my invention is of special utility as an electric phonograph pickup for lateral-cut or vertical-cut records. The characteristic feature of my device is an elastic magnetic ring connected at its circumference to the neutral point of a magnet. This connecting point also constitutes a rigid support for the elastic ring, which is adapted to vibrate in its own plane by deformational movements. The poles of the magnet are arranged substantially on a diametric line with respect to the ring and form a pair of airgaps therewith. The least vibration of the ring causes variation of these airgaps. One or more coils are operatively associated with the magnet and elastic ring. When the instrument is used as a transmitter, an acoustically actuated member (such as a diaphragm or phonograph stylus) is connected to the elastic magnetic ring diametrically opposite its point of support, so that the vibrations of the member produce deformational movements of the ring in its own plane. As these movements are most pronounced opposite the magnet poles, they vary the airgaps of the magnetic system and produce current impulses which are amplified to operate or control suitable mechanism. The reverse action takes place when the device is used as a receiver.

The instrument of my invention is characterized by utter simplicity of construction and a high degree of sensitivity, particularly when used as a pickup. The elastic magnetic ring holds the stylus point in a substantially floating condition on the record, so that the minutest movements of the stylus are translated into electric impulses without lost motion and with practically no distortion.

In the accompanying drawings, which illustrate two embodiments of my invention,

Fig. 1 shows a side view of an electric pickup for playing vertical-cut records;

Fig. 2 represents a cross-section on line 2—2 of Fig. 1; and

Fig. 3 shows a slightly modified form, more simple than the construction of Figs. 1 and 2.

The operative mechanism of the instrument is contained in an appropriate casing 10, which is supposed to be mounted on an arm adapted to swing horizontally and vertically over the turntable of the phonograph. The casing has a hub 12 for receiving a suitable supporting arm, which I need not show or describe. The main body of the casing, which is of flat cylindrical shape like a pill box, may be cast, stamped or spun from light non-magnetic material, such as brass, aluminum and the like, or it may be molded from a suitable composition, of which bakelite is a well known example. The casing is closed by a removable cover 13, which may be held in place by screws engaging bosses 14 on the periphery of the casing.

An elastic magnetic ring 15 and a magnet 16 are supported in casing 10 by a fastening member 17, which is shown as a bolt and which is intended to represent any practical form of connecting means for the ring and the magnet. To hold the ring 15 spaced from the casing for free vibratory movement in its own plane, the bolt 17 passes through a lug or projection 18, which may be integral with the casing or a separate piece. The fastening member 17 not only supports the ring 15 and magnet 16 at a single point in the casing, but it also holds the ring in firm magnetic contact with the neutral zone of the magnet.

The magnet 16 is preferably of the permanent horseshoe type, either solid or laminated, and need not be heavy to produce a field of requisite strength, especially if made of cobalt steel. Pole pieces 19 are secured to the polar ends of the magnet by screws 20, or otherwise. In the present instance, each pole piece 19 consists of a recessed central portion 21 and a pair of lateral extensions 22 and 23. The ends of magnet 16 fit snugly in the recessed portions 21 of the pole pieces, thereby facilitating the attachment of the pole pieces and also providing increased magnetic contact with the magnet. The pole pieces 19 can be stamped out of flat material, which ought to be of high magnetic permeability. The polar extensions 22 and 23 are in a substantially diametric line in relation to the magnetic ring 15. While this arrangement is preferable, it is not absolutely necessary. The outer polar extensions 22 terminate closely adjacent to the ring 15 to provide a pair of airgaps 24 in series. In Fig. 2 I have purposely shown the magnetic ring 15 in cross-section only, so as to show the airgaps 24 more clearly. The inner polar extensions 23 are separated by a fixed airgap 25 of predetermined length to provide a certain amount of reluctance in this portion of the magnetic path.

A coil 26 surrounds the polar extensions 23 and is firmly held thereon without the need of additional fastening means. As seen in Figs. 1 and 2, the coil 26 is flat or oval shaped, so that it closely hugs the flat polar extensions 23. The casing 10 need not be deeper than the width of coil 26. Conductors 27 connect the coil 26 in a suitable circuit for amplifying the electric impulses produced in the coil by the vibrations of the elastic magnetic ring 15. The conductors 27 may be led through the hollow supporting arm or tube to which the hub 12 is attached.

A stylus holder 28 is attached to the elastic magnetic ring 15 at a point which preferably is diametrically opposite the supporting point 17. A screw or rivet 29 connects the stylus holder 28 to the ring 15, but any other practical attaching means may be used. The stylus holder 28 is in this instance adapted to play vertical-cut records of the Edison type, which are usually played with a diamond point mounted at the proper angle. A hole 30 in the lower end of casing 10 allows the stylus holder 28 to project out of the casing a sufficient distance to enable a person to place the stylus point easily in the record groove.

The operation of the pickup above described will be clear from the description already given, and I need only say that the vertical vibrations of stylus member 28 produce deformational movements of the elastic magnetic ring 15 in its own plane, so that the airgaps 24 are varied in accordance with the movements of the stylus. The field flux of magnet 16 has two paths: one through the polar extensions 23, which are separated by a fixed airgap 25, and the other path through the polar extensions 22 across the variable airgaps 24 and through the magnetic ring 15, which is connected to the neutral point of the magnet. Consequently, as the vibrations of ring 15 vary the airgaps 24, the magnetic flux through the coil 26 is correspondingly changed to produce current impulses which are electrical representations of the mechanical movements of the stylus. The current impulses in circuit of coil 26 are amplified to operate loudspeaker mechanism, or any other desired apparatus. It will not be necessary to show or describe any particular form of amplifying circuit, because such circuits are well understood by those familiar with the radio art. One advantage of mounting the coil 26 in the shunt path of higher permeability than the steel body of the magnet is to increase the sensitiveness of the instrument.

Fig. 3 shows an electric pickup of utmost simplicity. The U-shaped permanent magnet 16 terminates in a pair of polar extensions 16' arranged on a diametric line similar to the polar extensions 22 of Figs. 1 and 2. Either or both of the polar extensions 16' are surrounded by a coil 26' adapted to be connected in circuit, as previously explained in reference to coil 26. If two coils 26' are used, they are preferably connected in series. The polar extensions 16' may be separate and attached to the main body of the magnet, but it is simpler to make them integral with the magnet itself, which can be shaped in one operation from a piece of steel, solid or in laminæ. What has been said about the operation of Fig. 1, applies to Fig. 3 without the need of repetition, except that in Fig. 3 there is no shunt path across the poles of the magnet as in Fig. 1.

The elastic magnetic ring 15 is made of metal having a high magnetic permeability, and is so dimensioned as to possess the right degree of resilience. This can readily be determined by experiment well within the skill of the artisan in this particular line. The weight of the pickup on the stylus point in the record groove imposes the right amount of load to maintain the stylus safely in the groove, and the elasticity of ring 15 causes the latter to respond instantly and faithfully to the stylus vibrations without lost motion. The entire device can be made very compact, since the ring 15 and magnet 16 are mounted in the same plane parallel with the casing. The drawings have been purposely exaggerated for clearness; the actual device need be no bigger than a watch.

The arrangement of the magnet poles inside the elastic armature ring 15 has several practical advantages, especially in a phonograph pickup. In the first place, when the stylus point is placed on a record, the weight of the pickup expands the ring horizontally and moves it away from the pole pieces. Therefore, the ring 15 can never be jammed against the poles of the magnet, even if the pickup should be dropped on a record, as frequently happens with phonograph reproducers of all kinds. Furthermore, by having the armature ring 15 outside the magnet, the enclosing casing need not be much bigger than the ring itself, whereby a pickup of unusual lightness and compactness is obtained.

The pickup above described can be used for lateral-cut records by simply connecting a pivoted needle-arm to the ring 10 at 29 and properly mounting the casing 10 on a supporting arm. This will be clear without further description or illustration. By substituting an acoustic diaphragm for the stylus holder 28, the instrument can be utilized as a telephone transmitter, particularly for broadcasting or phonographic recording purposes. The instrument of my invention operates equally well as a receiver. If the member 28 is a recording tool and electric impulses are sent through coil 26 (or 26'), the device can be used to make phonograph records.

It goes without saying that my invention is not confined to the precise details set forth, but changes and modifications can be made without departing from the scope of the invention as defined in the appended claims.

I claim as my invention:

1. In an electromagnetic instrument, the combination of an elastic magnetic ring adapted to vibrate in its own plane, a magnet mounted within said ring and having two pole pieces spaced from said ring by airgaps, means for connecting said ring at its circumference to the neutral part of said magnet, and a common support for said ring and element.

2. In an electromagnetic instrument, a substantially U-shaped magnet having a vibratory armature in the form of an elastic magnetic ring connected at its circumference to the neutral part of said magnet, said ring surrounding said magnet and being adapted to vibrate in its own plane, the poles of said magnet being spaced from said ring to provide a pair of airgaps which are simultaneously varied by the movements of said ring.

3. In an electromagnetic instrument, the combination of an elastic magnetic ring adapted to vibrate in its own plane, a substantially U-shaped magnet mounted within said ring and rigidly supported, and means for connecting said ring at its circumference to the neutral part of said magnet, said ring being spaced from both poles of said magnet to form variable airgaps.

4. In an electromagnetic instrument, the combination of a support, a magnet, an elastic magnetic ring surrounding said magnet and adapted to vibrate in its own plane, and a bolt or like member for connecting said magnet and ring to each other and to said support, said bolt connecting said ring to the neutral part of said magnet, the poles of said magnet being spaced from said ring to provide a pair of airgaps which are simultaneously varied by the movements of said ring.

5. The combination of an elastic magnetic ring adapted to vibrate in its own plane, a substantially U-shaped magnet mounted within said ring in the plane thereof and having pole pieces arranged in a substantially diametric line relatively to said ring which is spaced from both pole pieces to form variable airgaps oppositely arranged, and means for connecting said ring at a point in its circumference to the neutral part of said magnet.

6. An electromagnetic instrument comprising a substantially U-shaped magnet having pole pieces, means for supporting said magnet, an elastic magnetic ring connected at its circumference to the neutral part of said magnet and adapted to vibrate in its own plane, said pole pieces projecting away from each other and at their farther ends being separated from said ring by airgaps which vary with the vibrations of said ring, and a coil influenced by the movements of said ring or adapted to produce vibration thereof in response to current impulses.

7. In an electromagnetic instrument, the combination of a casing having a flat cylindrical body, an elastic magnetic ring mounted in said casing so as to vibrate in its own plane, the circumference of said ring following closely the inner circular wall of said casing, a substantially U-shaped magnet arranged in said casing in operative relation to said vibratory ring, said magnet having pole pieces forming two airgaps with said ring on the inside thereof, and a single fastening device for securing said ring and magnet to said casing, said device connecting said ring at a point in its circumference to the neutral part of said magnet.

8. A substantially U-shaped magnet having a vibratory armature in the form of an elastic magnetic ring connected at its circumference to the neutral part of said magnet, said ring being adapted to vibrate in its own plane, pole pieces on said magnet arranged on a diametric line substantially at right angles to a diameter including said connection between the ring and the magnet, said pole pieces being arranged inside said ring and separated therefrom by airgaps which vary with the vibrations of the ring, and means for converting the movements of said ring into electric impulses or vibrating said ring in accordance with transmitted impulses.

9. An electromagnetic transmitter comprising a substantially U-shaped magnet having pole pieces, means for supporting said magnet, an elastic magnetic ring connected at its circumference to the neutral part of said magnet and adapted to vibrate in its own plane, said pole pieces being arranged on a substantially diametric line relatively to said ring and spaced from said ring by airgaps, actuating means connected to said ring at a point substantially diametrically opposite said connection between the magnet and the ring, means on said magnet for providing a magnetic shunt path with a predetermined airgap, and a coil in said shunt path for converting the vibrations of said ring into electric impulses.

10. In an electromagnetic instrument, a substantially U-shaped magnet provided with pole pieces consisting each of a pair of oppositely extending arms, each pole piece being connected at its center to said magnet, the two inner arms being spaced by a fixed airgap to provide a magnetic shunt of predetermined reluctance, a coil on said inner arms, and an elastic magnetic ring supported at a point in its circumference so as to vibrate in its own plane, said polar arms being arranged in a substantially diametric line relatively to said ring, the two outer arms being spaced from said ring to form variable airgaps.

11. An electric phonograph reproducer for playing vertical-cut records comprising a flat casing adapted to be operatively supported in vertical position, an elastic magnetic ring and a substantially U-shaped magnet mounted in said casing in the plane thereof, said ring surrounding the pole pieces of said magnet and forming therewith a pair of diametrically opposite airgaps, means for securing said magnet and said ring to the upper part of said casing, said securing means also connecting said ring at a point in its circumference to the neutral part of said magnet, and a stylus connected to said ring at a point substantially diametrically opposite said securing means.

12. In an electromagnetic instrument, the combination of a flat cylindrical casing, an elastic magnetic ring mounted in said casing so as to vibrate in its own plane, the sides of said ring being substantially parallel with the sides of said casing, a substantially U-shaped magnet arranged in said casing in operative relation to said vibratory ring, a fastening member for securing said ring and magnet to said casing, said member passing through the neutral point of said magnet and holding said ring clamped at a point in its circumference between the magnet and the casing, actuating means connected to said ring at a point diametrically opposite its point of support, means on said magnet for providing a magnetic shunt with a predetermined airgap, and a coil in said shunt path influenced by the movements of said ring or adapted to produce vibration thereof in response to current impulses.

13. In an electromagnetic instrument, an elastic magnetic ring adapted to vibrate in its own plane, a magnet having pole pieces in operative relation to said ring, means for connecting said ring at its circumference to the neutral part of said magnet, means on said magnet for providing a magnetic shunt with a predetermined airgap, and a coil in said shunt path influenced by the movements of said ring or adapted to produce vibration thereof in response to current impulses.

14. An electric phonograph reproducer for playing vertical-cut records comprising a casing adapted to be operatively supported in relation to a record, an elastic magnetic ring supported in said casing in a substantially vertical plane and connected to said casing at the top, said ring being adapted to vibrate in its own plane, a stylus projecting from said casing and connected to the bottom part of said ring to actuate the same, a magnet mounted within said ring and having pole pieces arranged to form a pair of diametrically opposite airgaps with said ring, means for connecting said ring to the neutral part of said magnet, and a coil for converting the movements of said ring into current impulses, said ring and pole pieces being relatively so arranged that the weight of the reproducer on the stylus point tends to widen said airgaps.

ADOLPH A. THOMAS.